United States Patent
Shively

[19]

[11] Patent Number: 5,861,125
[45] Date of Patent: Jan. 19, 1999

[54] PROTEIN OR PEPTIDE SEQUENCING METHOD AND APPARATUS

[75] Inventor: John E. Shively, Arcadia, Calif.

[73] Assignee: City of Hope, Duarte, Calif.

[21] Appl. No.: 629,690

[22] Filed: Dec. 18, 1990

Related U.S. Application Data

[60] Division of Ser. No. 174,956, Mar. 29, 1988, Pat. No. 5,061,635, which is a continuation-in-part of Ser. No. 72,754, Jul. 13, 1987, abandoned, which is a continuation-in-part of Ser. No. 896,724, Aug. 15, 1986, abandoned.

[51] Int. Cl.$^6$ ...................................................... B01L 11/00
[52] U.S. Cl. ........................... 422/101; 422/81; 422/103; 422/131; 436/89
[58] Field of Search .............. 422/116, 81, 101, 422/103, 131; 436/89

[56] References Cited

U.S. PATENT DOCUMENTS

| | | | |
|---|---|---|---|
| 3,346,486 | 10/1967 | Winter et al. ............................. | 436/89 |
| 3,615,235 | 10/1971 | Hrdina ..................................... | 436/89 |
| 4,180,383 | 12/1979 | Johnson .................................. | 422/101 |
| 4,252,769 | 2/1981 | Hood et al. .............................. | 436/89 |
| 4,276,048 | 6/1981 | Leaback ................................... | 436/180 |
| 4,289,620 | 9/1981 | Harq ....................................... | 210/198.2 |
| 4,483,964 | 11/1984 | Urdea et al. ............................ | 525/54.11 |
| 4,603,114 | 7/1986 | Hood et al. .............................. | 422/101 |
| 4,610,847 | 9/1986 | Hood et al. .............................. | 436/89 |
| 4,704,256 | 11/1987 | Hood et al. .............................. | 422/116 |

OTHER PUBLICATIONS

Matsudaira, J. Biol. Chem., vol. 262, No. 21, pp. 10035–10037, Jul. 25, 1987.
Aebersold et al; "Electroblotting onto Activated Glass"; Mar. 25, 1986; p. 4230.
Matsudaira, J. Biol. Chem , vol. 262, No. 21, pp. 10035–10037; Jul. 25, 1987.
Matsudaira, "Sequence form Picomole Quantities of Proteins Electroblotted onto Polyvinylidene Difluoride Membranes", Journal of Biological Chemistry 262:10035–10038 (1987).

*Primary Examiner*—William H. Beisner
*Attorney, Agent, or Firm*—Rothwell, Figg, Ernst & Kurz

[57] ABSTRACT

A method and apparatus for sequencing polypeptides, including a continuous flow reactor which may include a sample bearing membrane strip.

9 Claims, 7 Drawing Sheets

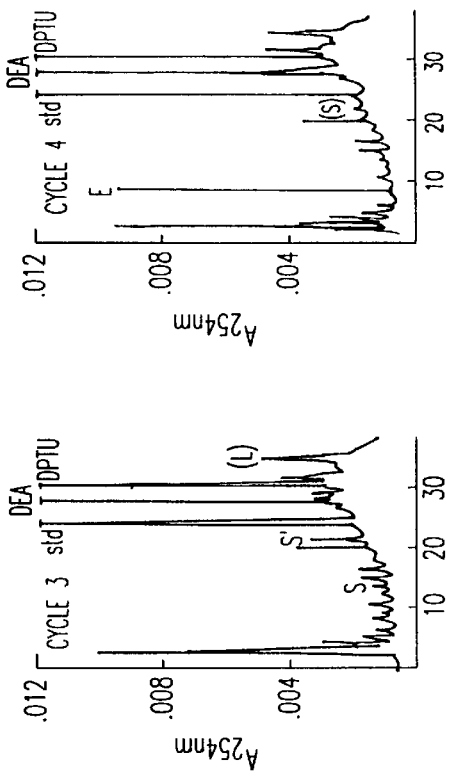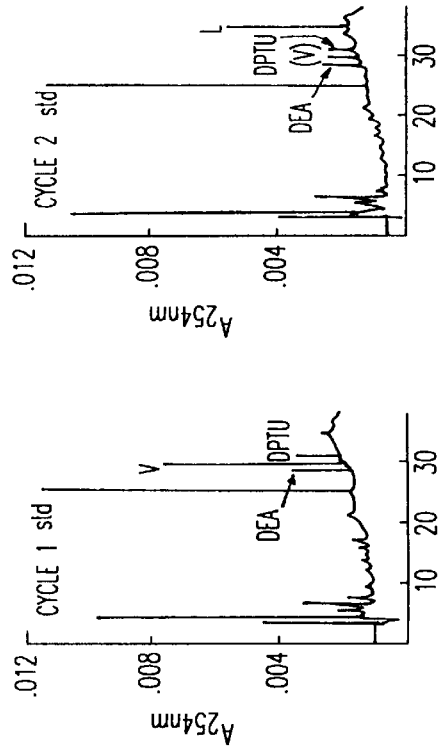

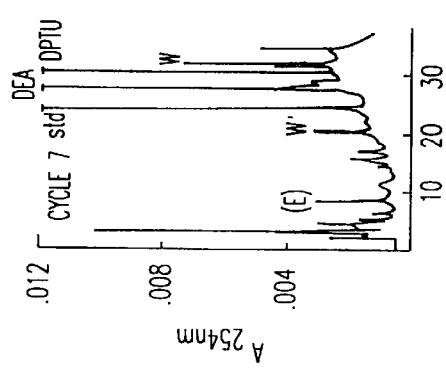
FIG. 5E
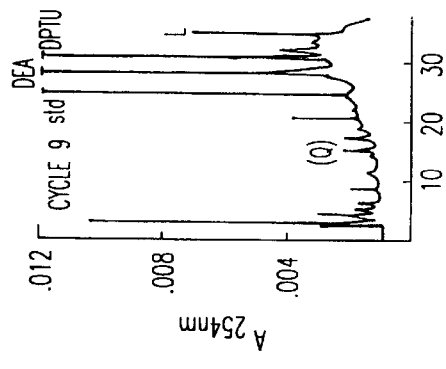
FIG. 5F
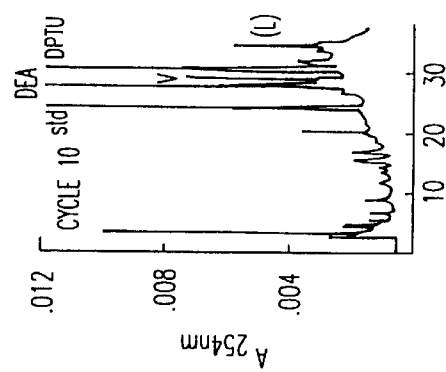
FIG. 5G
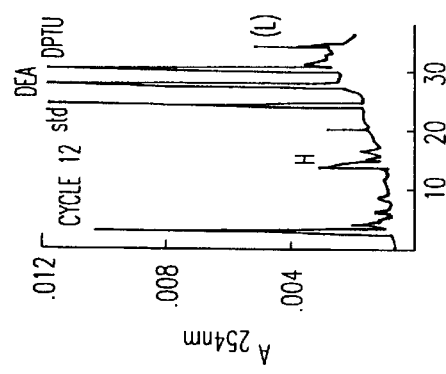
FIG. H
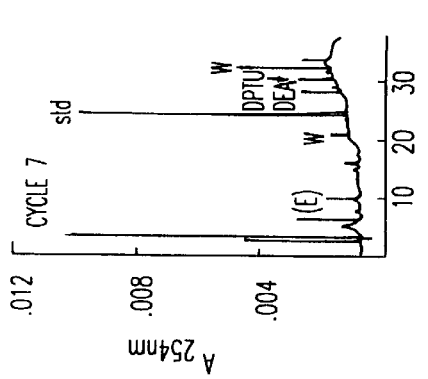
FIG. 5E'
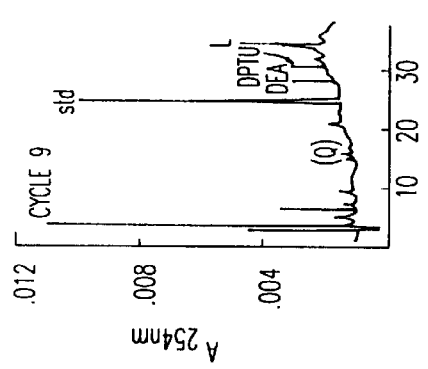
FIG. 5F'
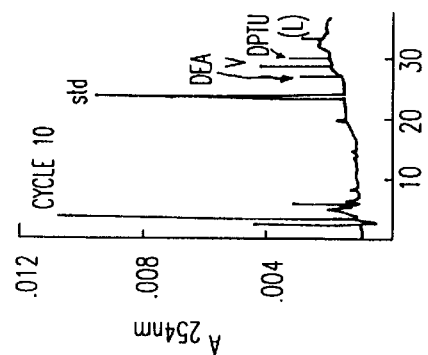
FIG. 5G'
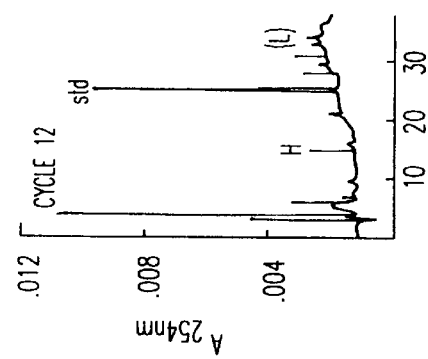
FIG. H'

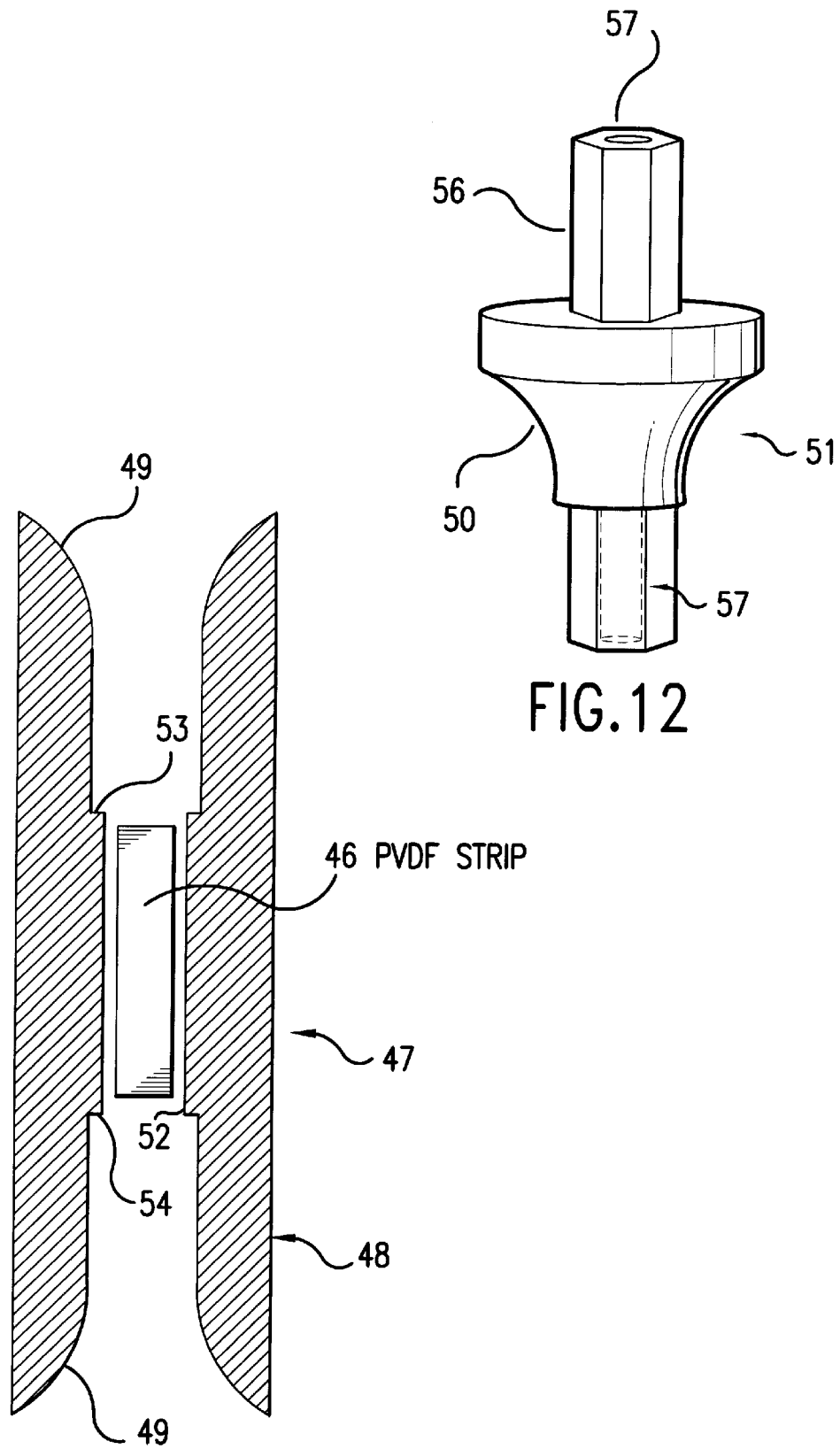

PROTEIN OR PEPTIDE SEQUENCING METHOD AND APPARATUS

This is a division of application Ser. No. 174,956 filed Mar. 29, 1988 now U.S. Pat No. 5,061,635 which is a continuation-in-part of Ser. No. 072,754 filed Jul. 13, 1987 now abandoned, which is a continuation-in-part of application Ser. No. 896,724 filed Aug. 15, 1986 now abandoned.

FIELD OF THE INVENTION

The invention relates to apparatus and methods for protein or peptide sequencing. In particular, the invention relates to continuous flow reactors for peptide sequenators, and to sequencing methods and apparatus in which such reactors are used.

DESCRIPTION OF THE PRIOR ART

Practical automated peptide sequencing dates from the 1967 introduction of the liquid phase spinning cup sequenator in which the reactions proceed in a thin liquid film formed on the inside wall of rotating reaction cells. See Edman, P., and Begg, G., A Protein Sequenator, *European Journal of Biochemistry*, 1:80–91 (1967). A focal problem associated with the spinning cup sequenator is sample loss, particularly of short peptides. An alternative solid phase degradation method entails passing reagents and solvents in an appropriate program through a column packed with porous material such as a macroporous polystyrene matrix or preferably porous glass beads to which a peptide is attached covalently or by adsorption. In another, known type of automatic sequencer the peptide to be degraded is covalently linked to a gel-type of solid phase support contained within a tubular reaction chamber. Both the reaction chamber and the tubing by which it is connected to the sequenator may be formed from glass or from polytetrafluoroethylene, e.g., "Teflon". See Laursen, R. A., A Solid-Phase Peptide Sequentaor, *European Journal of Biochemistry*, 20:89–102 (1971) and Shively, "Methods of Protein Characterization", Humana Press, Clifton, N.J. (1986), Chapter 9.

A sequenator that employs gas phase reagents instead of liquid phase reagents at critical points in the Edman degradation was proposed in 1981. See Hewick, R. M., Hunkapillar, M. W., Hood, L. E., Dreyer, W. J., A Gas-Liquid Solid Phase Peptide and Protein Sequenator, *The Journal of Biological Chemistry*, 256:79907997 (1981), U.S. Pat. No. 4,603,114 and Shively, supra, Chapter 8, Section 314, p. 229. This device includes a two-part glass cartridge assembly which houses a miniature continuous flow reaction chamber in which the peptide sample is presented as a dispersion in a thin film of a polymeric quaternary ammonium salt supported on a porous glass fiber disk. Means are provided for disconnecting the cartridge from its mounting base each time the sample is loaded. The cartridge is connected to a sequenator by Teflon tubing at its inlet and outlet ends.

A modification of the Hewick sequenator is described by Hawke, Harris and Shively in *Analytical Biochemistry*, 147, 315–330 (1985), and Shively, supra, Chapter 7, page 210, et. seq. This modification replaces the glass reactor cartridge assembly of Hewick with an all Teflon cartridge of similar design, thus providing an all Teflon delivery and reaction system. The sample is presented within the reaction chamber on trimethylsilyated glass fiber disk. Hawke, et al., noting that Teflon is "self-sealing", report lower background levels and increased yields deemed to be consequent from a better seal achieved in the all Teflon design as compared to the seal observed with the Hewick glass cartridge. See Shively, p. 217.

A multi-purpose sequenator constructed in units which are interchangeable for easy conversion to a spinning cup, column, or cartridge operational mode has been described. A polyfluorochloro (Kel-F) micro column unit filled with peptide bound glass support objects which has Teflon tubing inlet and outlet lines for attachment to a sequenator is provided. See Shively, p. 249 et. seq.

SUMMARY OF THE INVENTION

This invention provides an inexpensive continuous flow reactor column substantially free of unswept volumes in which accumulation of amino acids, by products and reagents is minimized. The reactor is inexpensive. Use of new and incontaminated reactors is facilitated by easy insertion into and removal from the sequenator.

The reactor is formed from chemically inert synthetic resin tubing. A reaction chamber comprising a section of such tubing of relatively large internal diameter is provided with interference fitted inlet and outlet tubes of appropriate dimension. In a preferred embodiment of the invention, the reactor is formed from Teflon tubing. It may be packed with discrete articles, e.g., porous glass beads, or a porous synthetic resin such as polystyrene coated with the protein or peptide to be sequenced. When such packings are used, a porous support member, preferably of Teflon, may be provided. Pursuant to another embodiment of the invention, the sample may be borne by a hydrophobic membrane such as polyvinyl difluoride (PVDF) to which proteins adhere. Optionally the hydrophobic membrane may be coated with a polymeric quaternary ammonium salt such as 1,5 dimethyl-1,5-diazaundecamethylene, polymethobromide or poly (N,N-dimethyl-3,5-dimethylene piperidinium chloride. One such product is available under the trademark Polybrene from Aldrich Chemical Company.

BRIEF DESCRIPTION OF THE DRAWINGS

The novel features of the invention will be more readily appreciated from the following description when read in conjunction with the appended drawings, in which corresponding components are designated by the same reference numerals throughout the various figures.

FIG. 5 is a comparative set of chromatograms obtained using a continuous flow reactor of the present invention and a prior art cartridge reactor;

FIG. 11 is a sectional view, in plan, of another form of continuous flow reactor for use with PDVF or equivalent membranes bearing the protein or peptide to be sequenced.

FIG. 12 is a sectional view of a cap bearing an inlet (supply) or an outlet (drain) tube for the reactor shown by FIG. 11.

DETAILED DESCRIPTION OF THE INVENTION

Figure 1:
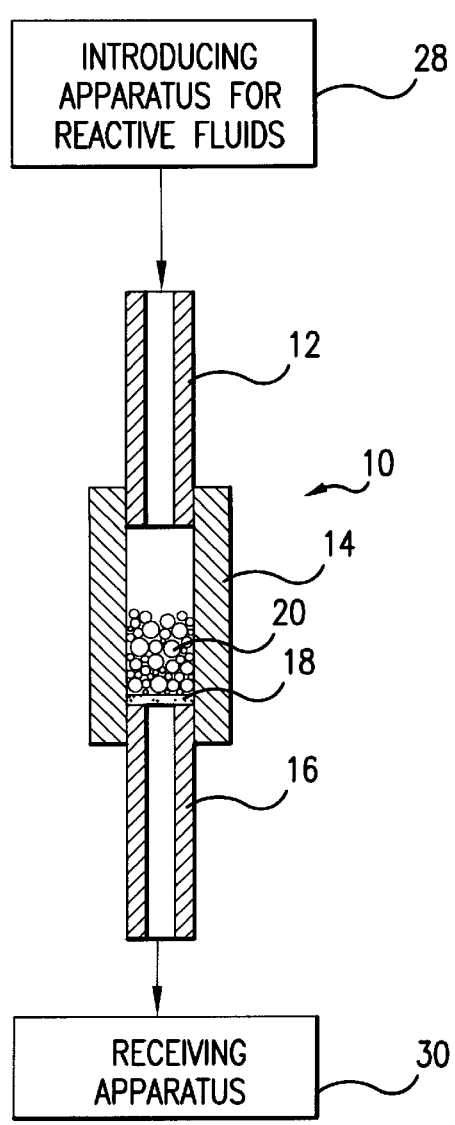
FIG. 1 is an elevational view, in section, of a continuous flow reactor constituting one embodiment of the intion.

A continuous flow reactor according to the present invention is shown in FIG. 1 where it is generally designated by reference numeral 10. The continuous flow reactor 10 includes reaction tube 14 and interference fitted supply and drain tubes 12 and 16. Each of the tubes 12, 14 and 16 is formed from a self-lubricating fluorocarbon such as a polytetra-fluoroethylene. Numerous fluorocarbons are available. See, e.g., *Plastics Engineering Handbook*, Van Nostrand Reinhold Co. (1976), pp. 60–62.

Each of the tubes 12 and 16 may be of substantially the same size, and the reaction tube 14 may be larger than the tubes 12 and 16. For example, the tubes 12 and 16 may have an outer diameter of approximately one-sixteenth (1/16 or 0.0625) inch. The reaction tube 14 may have an inner diameter also of approximately one-sixteenth (1/16 or 0.0625) inch and an outer diameter of approximately one-eighth (1/8 or 0.125) inch. The inner diameter of the reaction tube 14 is slightly undersized relative to the outer diameters of the tubes 12 and 16. With these size relationships, leak proof joints are provided between the tubes 12 and 16 by interference or press fitting.

Alternatively, the drain tube 16 may be larger and so dimensioned as to provide a press fit on the outside instead of the inside of the reaction tube 14 as shown in FIG. 1. A reaction zone free of unswept volumes is provided in this manner.

A porous support member 18, such as a disk, is tightly fitted inside the reaction tube 14. Preferably, the support member 18 is positioned near the location of the upper edge of the tube 16 as in the embodiment shown in FIG. 1. The support member 18 has a porosity requisite to allow passage of fluids and yet retain discrete objects 20, such as beads packed into the upper portion of the reaction tube 14. Support member 18 is formed from a chemically inert synthetic resin, preferably a fluorocarbon. For example, the support member 18 may be made from polytetrafluoroethylene cut by a 14-gauge needle to provide a circular disk slightly larger than the inner diameter of the reaction tube 14. The disk can be pressed into the reaction tube 14 where it will be retained in the desired position by the resulting press fit.

Useful support members 18 may be formed from a synthetic resinous material sold under the trademark "ZITEX". This material is available from a number of suppliers including Norton Chemplast, 150 Dey Road, Wayne, N.J. in different porosities such as extra fine, fine and medium. Materials with all of these different porosities can be used satisfactorily in the continuous flow reactor 10.

The reaction tube 14 is appropriately packed with discrete objects 20. Preferably, the discrete objects are made from a porous material such as a porous silica, microporous glass beads, or macrorecticular polystyrene. The discrete objects may be irregular or spherical. Suitable discrete objects having an irregular and porous configuration may be obtained from Electro-Nucleonics, 368 Passaic Avenue, Fairfield, N.J.. Preferred irregular discrete objects have a mesh size between one hundred and twenty Angstroms (120Å) and two hundred Angstroms (200Å) and a pore size of approximately three hundred and seventy nine Angstroms (379Å). Silica packing materials meeting these specifications are available as GC Porasils B and C from Waters Chromatography Division of Millipore Corporation, 34 Maple Street, Milford, Mass. See *Waters Sourcebook for Chromatography Columns and Supplies* (1986).

Spherical discrete objects having a diameter of from about one hundred microns ($100\mu$) to three hundred microns ($300\mu$) are preferred. Such spherical objects when packed in the reaction chamber 14, provide spacings which assure that fluids will flow along substantially non-linear paths and will be drained without entrapment. The provision of non-linear flow paths is further facilitated by the use of packings which comprise a plurality of different sized spherical objects. For example, a mixture of spherical particles of different diameters in the range of one hundred microns ($100\mu$) to three hundred microns ($300\mu$) is appropriate.

Silica derivatives, such as octadecyl silica and octyl silica, may also be used for the discrete objects 20 and may be preferred for the sequencing of certain peptides or proteins. Various other silica derivatives currently available for reverse phase high performance liquid chromatography may be used. Such derivatives may be either specifically prepared for use in the reactor of this invention, manufactured or purchased. Waters GC Porasils B and C and Waters GC Bonda-pack C18 material may be used as a starting material for the preparation of silica derivatives.

Figure 2:
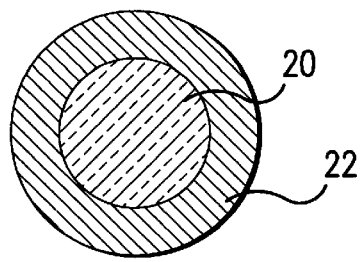
FIG. 2 is a sectional view, in plan, of a discrete object with one coating used in the continuous flow reactor shown in FIG. 1.

The discrete objects may be coated with a peptide 22 (see FIG. 2) which is to be sequenced. For example, one microgram or less of the peptide may be provided for each milligram of the discrete objects. In a specific case, 1–3 micrograms of sperm whale apomyoglobin may be added to 5–10 milligrams of the discrete objects.

The peptide sample size depends on the purity, molecular size and the desired number of amino acid residues to be determined. It can be as low as 0.1 to 10 picomoles. Ten to twenty milligrams of discrete objects is generally adequate to provide 0.1 to 10,000 picomoles samples. However, the required quantity of such objects may vary by as much as tenfold for certain applications.

Figure 3:
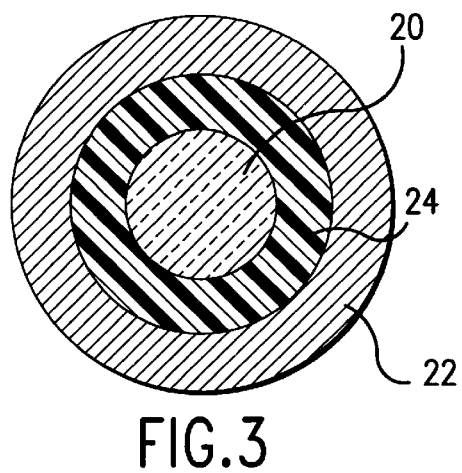
FIG. 3 is a sectional view, in plan, of a discrete object, e.g., glass bead, with two coatings used in the continuous flow reactor shown in FIG. 1.

Alternatively, a first coating material 24 (see FIG. 3), such as Polybrene which has affinity both for the objects and the peptides 22 is applied. A Polybrene coating is particularly appropriate when porous discrete objects are utilized.

Preferably, at least one milligram of Polybrene per milligram of discrete objects 20 is applied. However, the amount of Polybrene may vary approximately fifty percent (50%) above or below this amount.

The polymeric quaternary ammonium salt such as Polybrene may be applied before or after the discrete objects 20 are placed in the continuous flow reactor. In the case of a reaction tube as illustrated at 14 in FIG. 1 which may have a length of about 3 cm, a discrete object bed of from about 0.5 to 1.0 cm in length is appropriate thus providing 5 to 10 mg of: silica. Approximately 5 microliters ($5\mu l$) of 100 mg/ml of Polybrene solution is then applied to the discrete objects in the reaction tube.

When applied outside the reaction tube, a quantity of Polybrene or the like sufficient to wet the surfaces of the discrete objects completely is preferred. For example, either discrete objects providing about 10 mg of silica, or a Polybrene solution containing approximately 30 mg/ml is appropriate.

Figure 4:
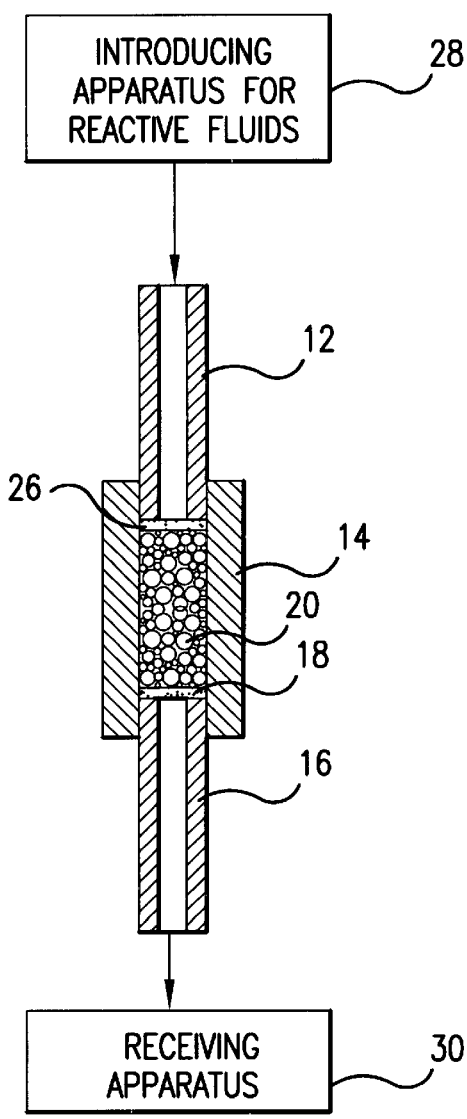
FIG. 4 is an elevational view, in section, of a continuous flow reactor constituting an alternative embodiment of the invention shown in FIG. 1.

FIG. 4 depicts a closure member 26 is disposed in the reaction tube 14 at a position near the end of the inlet tube 12. It may be constructed in a manner similar to the support member 18. It encloses the top of the reaction tube 14 to confine the discrete objects 20.

FIG. 5 shows chromatograms which provide a comparison of sperm whale apomyoglobin sequencing results in cycles 1 through 4 and 7, 9, 10 and 12, obtained with a cartridge reaction chamber as shown in Hawke (1985), and with a continuous flow reactor 10 of this invention.

The upper panels A–H in FIG. 5 show Edman degradation cycles for the sequencing of 200 picomoles of sperm whale apomyoglobin using a cartridge reaction chamber made from polytetrafluoroethylene as described by Hawke (1985). Before the sample could be applied, it was necessary to coat the glass fiber disk in the reaction chamber with Polybrene (1 mg) and precycle the disk for two 45 minute cycles of Edman chemistry.

The amino acid derivatives obtained from the cartridge reaction chamber were analyzed by reverse phase high performance chromatography by a method similar to that of Hawke (1985).

The lower panels, A'–H' in FIG. 5 are the chromatograms obtained from an 80 picomole run of sperm whale apomyoglobin using a continuous flow reactor 10 as of this invention connected to the same sequencing apparatus as described above for the prior art cartridge reaction chamber. Chromatographic analysis of the derivatives was conducted in the same way and at the same attenuation settings.

The large offscale peaks labeled DEA and DPTU in the panels of FIG. 5 are common background peaks observed in Edman chemistry. The DEA peak is the phenylthiocarbamyl derivative of diethylamine (DEA), a trace contaminant of triethylamine (TEA). The DPTU peak is diphenylthiourea, which is formed from the reaction of phenylisothiocyanate (PITC) with aniline formed by the base catalyzed destruction of PITC.

These peaks, plus a number of smaller, unidentified peaks, constitute the background noise which interferes with the identification of the phenylthiohydantoin (PTH) amino acid derivatives. In each cycle, the single letter labeled peak corresponds to the assignment: V=valine, L=leucine, S=serine (S'=a breakdown product of serine), E=glutamic acid, W=tryptophan, and H=histine. The peak labeled "std" is an internal standard (the PTH derivative of aminoisobutyric acid). The peaks labeled in parentheses in the panels are the carryover signals from the previous cycle. Its appearance on a chromatogram is normal.

Even though less than 50% of the amount of sperm whale apomyoglobin was sequenced on the continuous flow reactor 10, there is adequate sensitivity compared to the results obtained with the cartridge reaction chamber. This is seen, for example, by comparing the signals for valine (V) in panels A and A' or the signals for leucine (L) in panels B and B'. An improved signal-to-noise ratio is provided in addition to substantial sensitivity by the reactor 10. The improved signal-to-noise ratio is directly apparent from a comparison of the signal magnitudes for DEA, V and DPTU in panels A and A'. In panel A the signal magnitudes for the DEA and DPTU background noise signals are greater than that for V, the sought-after assignment. This relationship of signal magnitudes is reversed in panel A' where the results using the continuous flow reactor 10 are shown. Such improved signal-to-noise ratios are repeated in all of the panels.

The continuous flow reactor 10 of this invention considerably facilitates the sequencing of the small sample. In addition, the sample was directly analyzed, without precycling, after the addition of Polybrene with consequent savings in time.

Figures 6, 7:
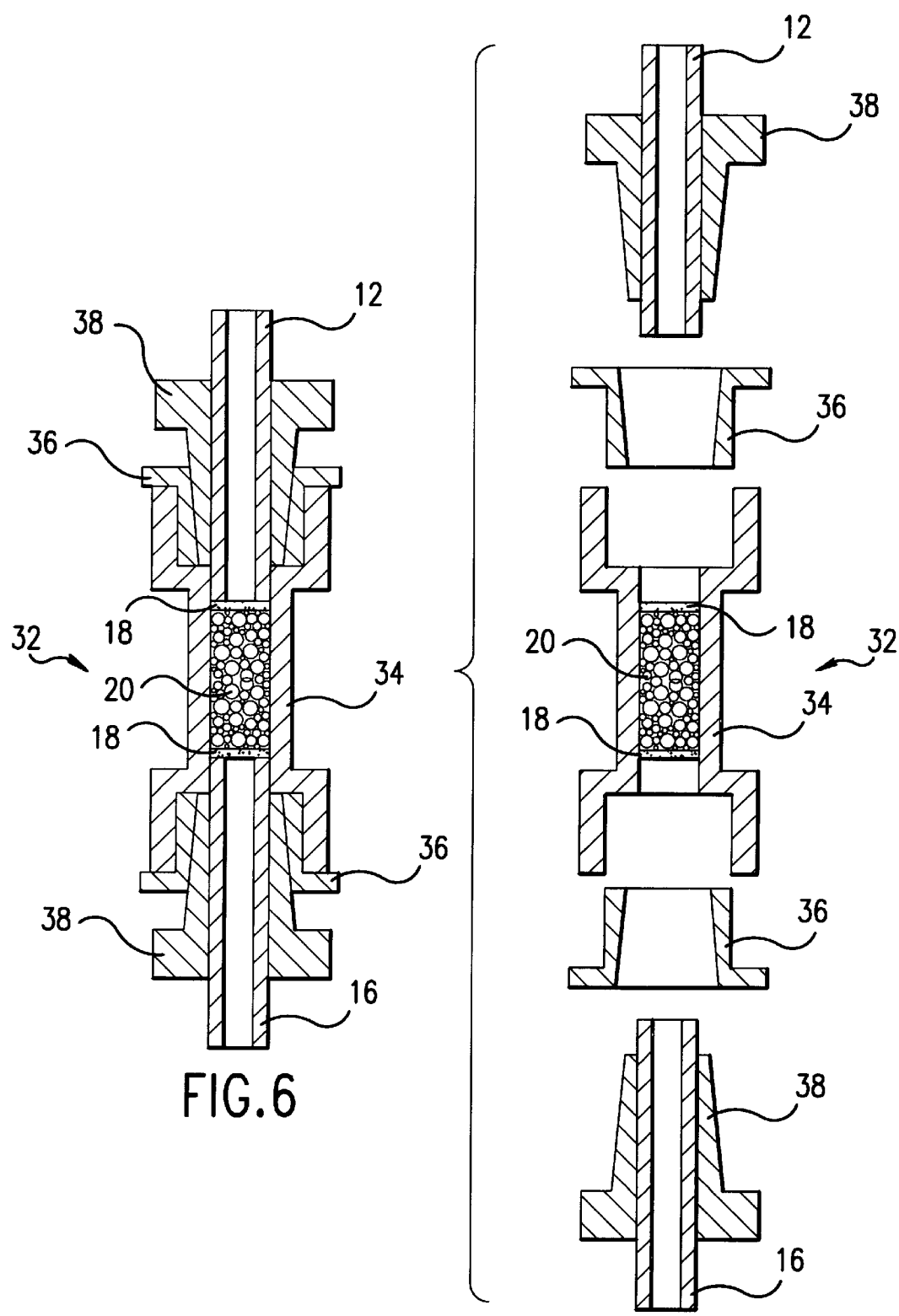
FIG. 6 is an elevational view, in section, of a continuous flow reactor constituting a second embodiment of the invention.
FIG. 7 is an exploded view of the continuous flow reactor shown in FIG. 6.

A second embodiment of the continuous flow reactor of the present invention is shown at 32 in FIGS. 6 and 7. The reactor 32 includes reaction tube 34, and interference fitted adapter caps 36, and adapter plugs 38 into which are interference fitted supply and drain tubes 12 and 16. Each of the reaction tube 34, adapter caps 36, adapter plugs 38, supply and drain tubes 12 and 16 is formed from chemically inert, pliable synthetic resinous material, preferably a self-lubricating fluorocarbon such as polytetrafluoroethylene.

The leak tight joints are provided by close interference or press fittings between the reaction tube 34 and the adapter caps 36, and between the adapter plugs 38 and the supply and drain tubes 12 and 16. The interference fitted parts may be chamfered to facilitate assembly. The fittings between adapter caps 36 and adapter plugs 38 can be made so that the inner surfaces of the adapter caps 36 against which the outer surfaces of the adapter plugs 38 contact are conical in shape. These surfaces can be roughened so that frictional contact is increased to prevent breakage of the leak-tight joints between the reaction tube 34 and tubes 12 and 16.

Figure 8:
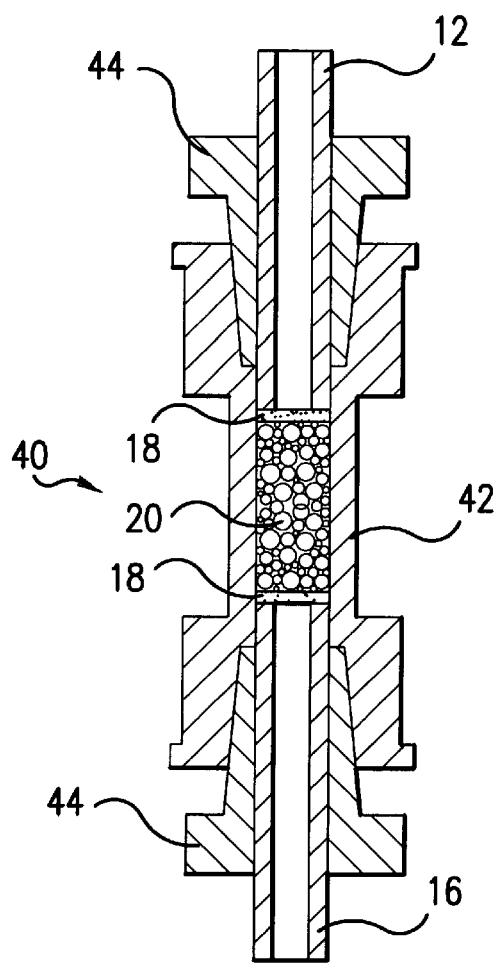
FIG. 8 is an elevational view, in section, of a continuous flow reactor constituting a third embodiment of the invention.
Figure 9:
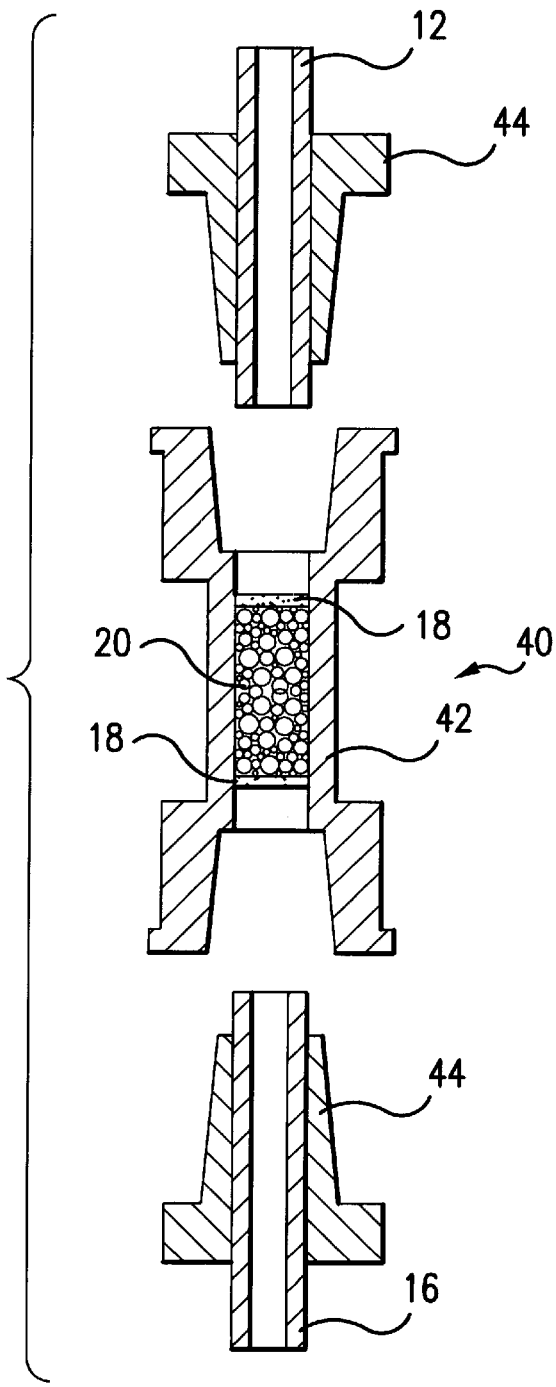
FIG. 9 is an exploded view of the continuous flow reactor shown in FIG. 8.

A third embodiment 40 of a continuous flow reactor shown in FIGS. 8 and 9. It includes a reaction tube 42 with adapter plugs 44, and supply and drain tubes 12 and 16. The adapter caps 36 of the second embodiment have been replaced by conical surfaces at the ends of the reaction tube 42 for mating with the adapter plugs 44. To provide leak proof joint, all of the parts for the reactor 40 are preferably formed from chemically inert, pliable synthetic resinous material such as polytetrafluoroethylene.

Porous support members 18, such as disks, may be tightly fitted inside the reactor tubes 34 (of the second embodiment, see FIGS. 6 and 7) and 42 (of the third embodiment, see FIGS. 8 and 9). If used, the support members 18 are preferably positioned inside the reaction tubes 34 and 42 to allow about 4 mm. of length for the interference fits between the supply and drain tubes 12 and 16, and the reaction tubes 34 and 42. As shown in FIGS. 6 and 8 respectively, the support members 18 have a porosity requisite to allow passage of fluids and yet retain discrete objects 20, such as beads packed into the reaction tubes 34 and 42.

The continuous flow reactor 40 is connected by the tube 12 to an apparatus (sequenator) for introducing reactive fluids, e.g., Edman reagents, for N-terminal sequencing, or Stark reagents for C-terminal sequencing.

The isolation proteins in the low picomole range in sufficient purity for microsequence analysis has been a continuing problem. One long sought after goal is to sequence samples isolated from gels, particularly sodium dodecyl sulfate (SDS) gels. Methods of electroblotting samples from SDS gels to positively charged glass fiber paper have been explored.

Matsudaira[1/] reports high yields on protein samples electrotransferred from SDS gels to PVDF stained with Coomassie Blue and subjected directly to microsequence analysis on an Applied Biosystems Model 470 Sequenator. The stained bands were cut out, centered on the Teflon cartridge seal and placed in the sequenator. See generally, FIG. 5 of U.S. Pat. No. 4,603,114. 6 1/ Matsudaira, P. *J. Biol. Chem.*, 262:10035–10038 (1987).

Microsequence analysis of a protein carried by small PDVF strips presents unique problems for such cartridge based microsequencers. The sample is likely to be present on two or more strips. It is necessary, as Matsudaira illustrates, to lay the membrane strips across the cartridge seal. If the strips move or the reagent or solvent flow is not uniform across the strips, poor or irreproducible chemistry is likely to occur.

These problems are avoided by a fourth embodiment of this invention. Pursuant to that embodiment, the protein or peptize to be sequenced is placed on a PVDF or similar hybrophobic membrane and the membrane is stained, e.g., with Coomassie Blue, and cut into thin elongated strips for insertion into a, continuous flow reactor of this invention. No porous support member 18 is utilized. Sequencing ensues in the same manner as when the sample is carried by discrete porous objects.

Figure 10:
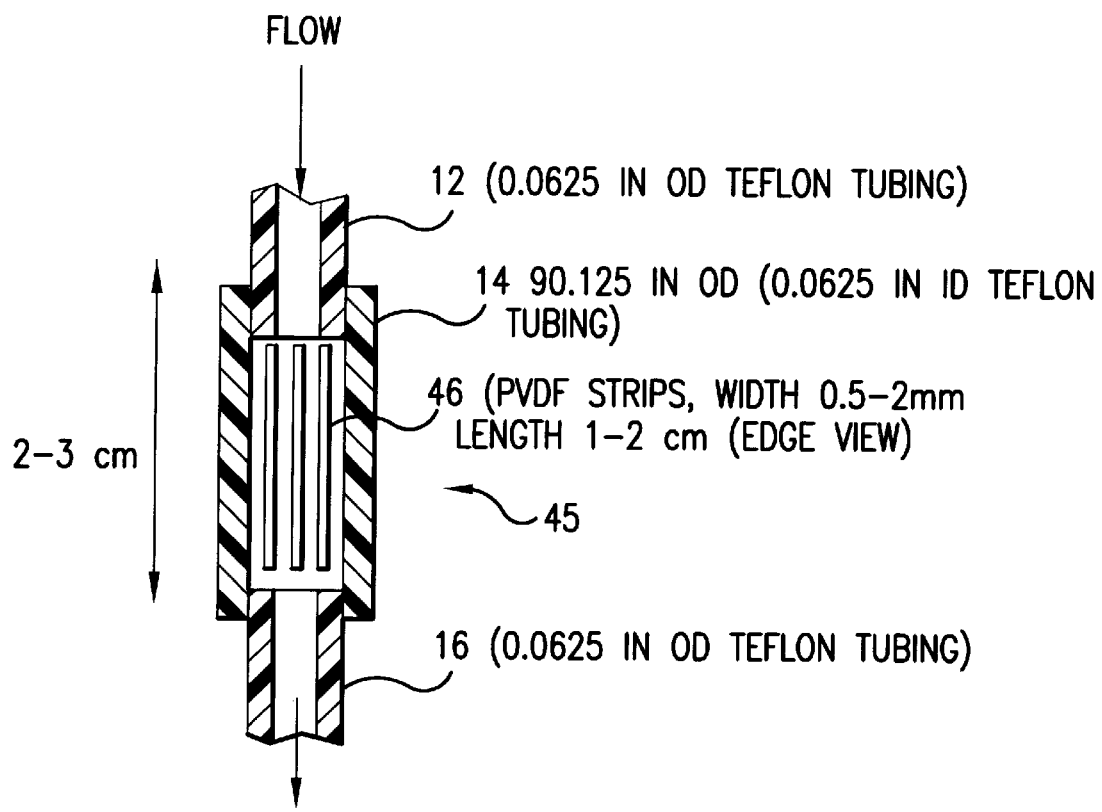
FIG. 10 is a sectional view of a fourth embodiment of a continuous flow reactor of the invention designed to accommodate strips of a hydrophobic protein or peptide bearing membrane such as polyvinyl difluoride (PVDF).

FIG. 10 depicts a continuous flow reactor 45 including supply and drain tubes 12 and 16 interference fitted to a reaction tube 14 which contains a plurality of sample bearing PVDF strips 46. The depth of insertion of the tubes 12 and 16 into the tube 14 preferably correlates with the length of the strips 46 to minimize the space between the tube ends and the strip ends.

FIGS. 11 and 12 depict a preferred reactor design 47 for use with sample bearing PVDF strips. Reactor tube 48 as shown in FIG. 11 is provided at each of its ends with a generally convex inner surface 49 which mates with the generally concave outer surfaces 50 of the supply or drain tube bearing caps 51 as shown by FIG. 12.

The inner diameter of the reactor tube 48 is reduced over a length 52 of its central portion thus providing upper and lower shoulders 53 and 54 within the tube 48. Sample bearing PVDF strips 46 are placed in the portion of the tube 48 which is of reduced inner diameter. Preferably the length of such strips is similar to the length of the portion 52 of the tube 48 which is of reduced inner diameter.

Like supply and drain tube bearing caps 51, see FIG. 12, are externally contoured to provide essentially leak proof fittings with each of the curved inner surfaces 49 at each of the ends of the reactor tube 48.

As shown in FIG. 12, a similar supply or drain tube 56 is carried by each of the caps 51. The outer surface of each supply or drain tube 56 is provided with opposed raised planar surface element 57 which may extend slightly beyond the tube 56 at the tube ends which are inserted into the reactor 47. Upon insertion of the caps 56 into the reactor tube 48, the ends 57 of these raised planar elements 57 seat against the shoulders 53 and 54.

The invention includes continuous flow reactors and associated supply and drain tubes for automated sequenators of various kinds including, among others, apparatus of the kind described in U.S. Pat. No. 4,704,256 for use when proteins or peptides are sequenced from samples on PVDF and similar hydrophobic membrane strips. Accordingly, the invention includes substantially cylindrical reactors for receiving elongated PVDF or similar sample bearing strips positioned parallel to the longitudinal axis of the reactor. Such reactors and associated supply and drain tubes accordingly may be fabricated from any desired chemically inert plastic, such as polyethylene or polypropylene. Particularly in the form of reactor shown in FIGS. 10, 11 and 12, the component parts are made from the same resinous materials as those described for the reactor tube 14 and supply and drain tubes 12 and 16 described with reference to FIG. 1 and assembled by interference fitting.

Any porous hydrophobic membrane to which peptides adhere, e.g., by adsorption, and which is stable to the sequencer chemistry may be utilized. PVDF membrane is preferred. PVDF membrane is available, in various pore sizes including 0.45 $\mu$m and in various thicknesses, from Millipore Corporation, Bedford, Mass. under the trademark "Immobilon PVDF transfer membrane". [2] PVDF membranes have a high surface area and a controlled open porous structure which provides strong retention of proteins adsorbed via hydrophobic interactions. The chemical structure of PVDF membranes provides stability and resistance to sequencer chemistry.

[2] See "Immobilon™ PVDF Transfer Membrane: A New Membrane Substrate for Western Blotting or Proteins", Pluskal et al. (1986) *Biotechniques* 4:272.

The invention also includes a membrane formed in part from a polymeric quaternary ammonium salt such as Polybrene and in part: from PVDF. A PVDF-Polybrene composition containing from about 25% to about 75%, preferably about 50% by weight of Polybrene or the like is appropriate for the formation of such membranes.

In a preferred practice of a method of this invention protein or peptide samples are electrotransferred from SDS gels, e.g., 8% or 12% gel to PVDF membranes. Conventional electrotransfer techniques are useful. Transfer yields on the order of 30–50% at 50V (500 mA) have been observed even at short transfer times of 10 minutes. Transfer yields may be improved by utilizing voltage settings of 25–30V (300 mA), adding a plurality of layers of membranes, for example, two layers and prewetting the membranes with methanol or acrylontrile.

Preferred procedure entails transfer to a Polybrene coated PVDF membrane or to a membrane of combined Polybrene-PVDF. Over a range of 25–100 pmol samples on 12% SDS gels optimum transfer time for lactoglobulin, ovalbumin and bovine serum albumin is about 100 minutes. Transfer efficiency of about 80% to about 95% is achieved. The actual value is a function of the sample. Longer transfer times have been observed to decrease recovery.

Samples can be stained with Coomassie Blue directly on the membranes. In the absence of Polybrene no background staining is observed. In the presence of Polybrene a uniform background is observed, but does not interfere with the detection of the samples.

Samples transferred to PVDF membranes, preferably after staining are cut into strips from about 0.05 to 2 mm in width and from about 1–3 centimeters in length for convenient insertion into a cylindrical reactor.

EXAMPLE 1

A $\beta$-lactoglobulin standard obtained from Sigma Chemical Company and radioiodinated with $I^{125}$. The radiolabelled protein was separated from free iodine by centrifuged gel permeation chromatography. The specific activity of the iodinated protein was in the range of 0.02–0.03 $\mu$Ci/$\mu$g. The labelled sample was mixed with an unlabelled sample to give 100,000 Cpm per 100 pmol of protein.

PVDF membranes were treated with Polybrene (10 mg/ml in methanol/water 1/1) for 1–2 seconds, air dried and rinsed with methanol. Two layers of Polybrene treated PVDF membranes, wet with methanol, were applied to the electrotransfer apparatus for transfer of the sample from 12% SDS gel. The transfer was accomplished in about 100 minutes at a voltage setting of 25–30V at 300 mA. Transfer efficiency was 90–95%. 50 pmol, 20 pmol and 10 pmol samples were prepared.

The PVDF bearing the sample was stained with Coomassie Blue and cut into multiple 1 to 1.5 mm strips 46 which were inserted into the reactor tube 14 of a continuous flow reactor as shown by FIG. 10. Sequencing was carried out generally in the manner described with reference to FIG. 5. The initial yields were 50%–60% and and repetitive yields in the range of 91–94%. Little or no background peaks were observed from the stained PVDF strips.

EXAMPLES 2 AND 3

Example 1 was repeated using ovalbumin and bovine serum albumin instead of β lactoglobulin as the sample. Similar results were observed. The efficiency of electrotransfer was 90–95% for ovalbumin and 80–90% for bovine serum albumin.

For bovine serum albumin, the initial yield from a 50 pmol sample was about 20% and the repetitive yield ranged from about 94% to about 98%.

The continuous flow reactors of this invention have important advantages. These reactors are:

(1) inexpensive, disposable, simple to construct, and easy to install into and remove from a sequenator. These features permit a series of reactors to be precharged and subsequently inserted into the sequenator as needed;

(2) have little unswept volume, i.e., volumes not flushed with fluids, where materials can accumulate. Substantially, leakproof seals to vapors and fluids are provided throughout the length of the reactor. These features minimize the accumulation of by-products or successive amino acids isolated from the sequenced peptide and, hence, the background which may interfere with the chromatogram identification of successive amino acids from the peptides;

(3) have few, if any, surfaces at which amino acids or by-products can be entrapped and accumulated which would later leach back into the flow stream and generate background signals in successive isolations of amino acids derivatives from a peptide;

(4) the discrete objects 20 disposed in the reaction tubes, e.g. tube 14 can be used as a sample concentrator in a method, similar to that used in reverse phase high performance liquid chromatography technology. The continuous flow reactors, e.g. the reactor 10 is compatible with high performance liquid chromatography technology and Edman and Stark chemistry technology. The discrete objects 20 in the continuous flow reactor 10 provide for good mass transfer characteristics which are clearly superior to the characteristics in existing cartridge technology.

The above discussion and related illustrations of the present invention are directed primarily to preferred embodiments and practices of the invention. However, it is believed that numerous changes and modifications in the actual implementation of the concepts described herein will be apparent to those skilled in the art, and it is contemplated that such changes and modifications may be made without departing from the scope of the invention as defined by the following claims.

I claim:

1. A continuous flow reactor for a peptide sequenator comprising:

(A) a cylindrical reaction chamber formed from a pliable, chemically inert tube;

(B) first and second pliable, chemically inert tubes for connecting the cylindrical reaction chamber to a sequenator, (C) the inside and outside diameters of said cylindrical reaction chamber tube and said first and second connecting tubes being so dimensioned that two leak-tight interference fit joints are provided by inserting one end section of a tube into the end section of another tube, one of said leak-tight interference fit joints being provided between said first tube and said cylindrical reaction chamber and the other being provided between said second tube and said cylindrical reaction chamber; said cylindrical reaction chamber containing at least one strip of hydrophobic membrane bearing a peptide sample, said strip being positioned in said cylindrical reaction chamber with its longitudinal axis substantially parallel to the longitudinal axis of said chamber.

2. The reactor of claim 1 in which at least one strip of sample bearing polyvinyl difluoride is included in said cylindrical reaction chamber.

3. A continuous flow reactor as defined in claim 2 in which the sample bearing polyvinyl difluoride strip is stained with Coomassie Blue.

4. A continuous flow reactor as defined in claim 2 in which the sample bearing polyvinyl difluoride strip is coated with polymeric quaternary ammonium salt.

5. For use in a protein or peptide sequenator a cylindrical reaction chamber which contains at least one strip of a synthetic resin membrane having a protein sample adsorbed thereon, said resin membrane being stable to sequencer chemistry, the longitudinal axis of said strip being substantially parallel to the longitudinal axis of said cylindrical reaction chamber.

6. A reaction chamber as defined in claim 5 in which the resin membrane is a polyvinyl difluoride membrane.

7. A reaction chamber as defined in claim 5 in which the resin membrane comprises a combination of polyvinyl difluoride and polymeric quaternary ammonium salt.

8. A reactor for a protein or peptide sequenator comprising:

an elongated body member;

a longitudinal passage for the flow of fluids through said body member;

at least one end of said passage having a convex surface to receive a cap member having a concave outer surface;

the inner wall of a central portion of said passage being raised, whereby the diameter of said passage in said portion is reduced; and shoulders at one end of said raised portion in said passage to abut the end of an inlet or outlet tube carried by said cap member.

9. A reactor as defined in claim 8 providing at least one end with a cap member having a fluid flow passage therethrough and comprising:

a plug with a concave outer surface to fit a convex inner surface of said reactor; and an inlet or outlet tube positioned in the fluid flow passage of said cap, said tube having at least one longitudinally extending raised element on its outer surface such that upon insertion of said cap in said reactor the inserted end of said raised element abuts a shoulder on the inner wall of the fluid flow passage of said reactor.

* * * * *